United States Patent [19]

Komatsu

[11] Patent Number: 5,576,845
[45] Date of Patent: Nov. 19, 1996

[54] ENCODING APPARATUS AND METHOD FOR PROCESSING COLOR DATA IN BLOCKS

[75] Inventor: Manabu Komatsu, Tokyo, Japan

[73] Assignee: Ricoh Co., Ltd., Tokyo, Japan

[21] Appl. No.: 246,086

[22] Filed: May 19, 1994

[30] Foreign Application Priority Data

May 19, 1993 [JP] Japan .................................. 5-141524

[51] Int. Cl.$^6$ ........................ H04N 1/419; H04N 1/415
[52] U.S. Cl. ................... 358/433; 358/261.1; 358/261.3
[58] Field of Search ............................. 382/56, 250, 244; 358/261.1, 261.2, 261.3, 427, 262.1, 430, 432, 433

[56] References Cited

U.S. PATENT DOCUMENTS 4,680,647  7/1987  Moriyama .............................. 358/343
5,267,333  11/1993  Aono ....................................... 382/56

*Primary Examiner*—Edward L. Coles, Sr.
*Assistant Examiner*—Kimberly A. Williams
*Attorney, Agent, or Firm*—Lowe, Price, LeBlanc & Becker

[57] ABSTRACT

The image encoding apparatus and encoding method thereof according to the present invention which encodes a multi-valued (color) image by dividing multi-valued (color) image data to blocks and constituting code data for each block, including the CPU which switches composition of the code data according to the remainder obtained by dividing a typical value in a block which is a portion of said code data by an integral number.

4 Claims, 19 Drawing Sheets

FIG. 8

| 255 | 255 | 255 | 255 |
|---|---|---|---|
| 255 | 255 | 0 | 0 |
| 255 | 255 | 0 | 0 |
| 255 | 0 | 0 | 0 |

255 = 1 (binary)
0 = 0 (binary)

LA % 3 = 1

| LA (127) | FIRST BYTE |
| $\phi ij = 0, 1$ (binary) (16 BITS) | SECOND BYTE |
| | THIRD BYTE |

FIG. 9A

PATTERN CODE TABLE A

FIG. 9B

PATTERN CODE TABLE B

| 80 | 80 | 80 | 80 |
|---|---|---|---|
| 80 | 80 | 80 | 0 |
| 80 | 80 | 0 | 0 |
| 80 | 0 | 0 | 0 |

| L A (41) | FIRST BYTE |
|---|---|
| L D (80) | SECOND BYTE |
| CODE NUMBER (4) | THIRD BYTE |

L A % 3 = 2

L D % 3 = 1 (PATTERN CODE TABLE A)
L D % 3 = 2 (PATTERN CODE TABLE B)

| 80 | 80 | 40 | 40 |
|----|----|----|----|
| 120 | 80 | 0 | 0 |
| 120 | 120 | 0 | 0 |
| 80 | 80 | 0 | 0 |

0 = 01 (binary)
40 = 00 (binary)
80 = 10 (binary)
120 = 11 (binary)

L A % 3 = 2
L D % 3 = 0

| | |
|---|---|
| L A (59) | FIRST BYTE |
| L D (120) | SECOND BYTE |
| $\phi ij = 0\ 0,$ | THIRD BYTE |
| $0\ 1,$ | FORTH BYTE |
| $1\ 0,$ | |
| $1\ 1,$ | FIFTH BYTE |
| (binary) | |
| ( 3 2 BITS ) | SIXTH BYTE |

FIG. 15
PRIOR ART
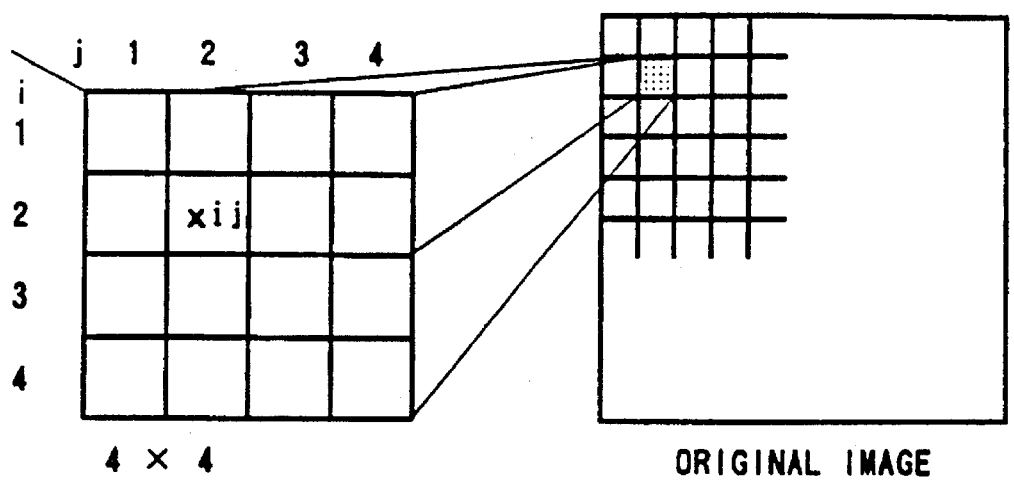
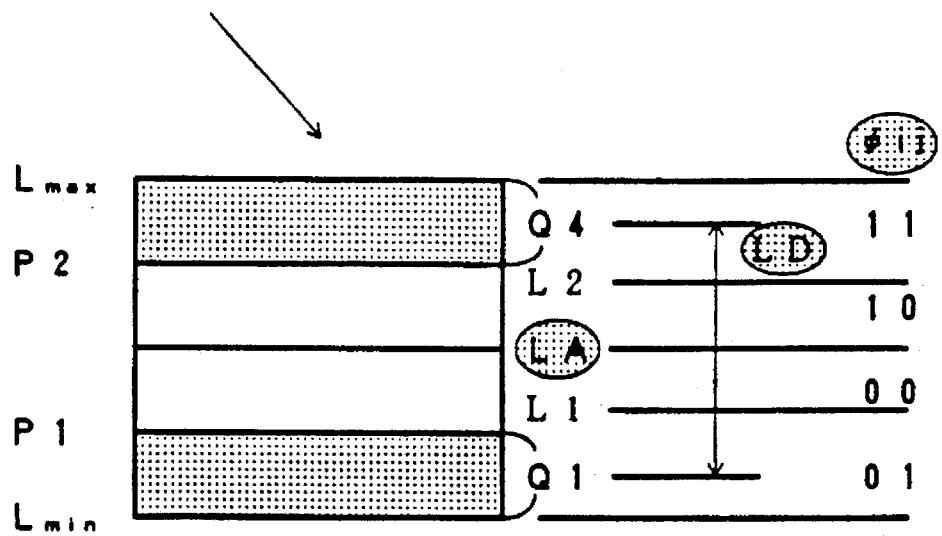

FIG. 16
PRIOR ART

```
P1 = (Lmax + 3Lmin) / 4
P2 = (3Lmax + Lmin) / 4
Q1 = mean of all xij such that xij ≤ P1
Q4 = mean of all xij such that xij > P2
LA = (Q1 + Q4) / 2
LD = Q4 - Q1
L1 = LA - LD/4
L2 = LA + LD/4
for (i = 1, ..., 4)
    for (j = 1, ..., 4)
        if xij ≤ L1           φij = 01 (binary)
        else if xij ≤ LA      φij = 00 (binary)
        else if xij ≤ L2      φij = 10 (binary)
        else                  φij = 11 (binary)
        end_if
    end_for
end_for
```

FIG. 17
PRIOR ART

```
for (i = 1, . . . . , 4)
    for (j = 1, . . . . , 4)
        if     φij = 0 1        yij = LA - LD / 2
        else if φij = 0 0        yij = LA - LD / 6
        else if φij = 1 0        yij = LA + LD / 6
        else                     yij = LA + LD / 2
        end_if
    end_for
end_for
```

ENCODING APPARATUS AND METHOD FOR PROCESSING COLOR DATA IN BLOCKS

FIELD OF THE INVENTION

The present invention relates to an encoding apparatus and encoding method thereof used for processing digital color images, to divided multi-valued (color) image data into blocks, generate code data for each block, and encode the coded data.

BACKGROUND OF THE INVENTION

As a color image encoding method for encoding multi-valued color image data by dividing the color data into blocks, and generating code data for each block which can insure a high quality decoded image even for a high space frequency color image other than natural images, the fixed length GBTC (Generalized Block Truncation Coding) type of encoding system is known.

FIG. 15 is an explanatory view illustrating the fixed length GBTC type of encoding system. Initially, an image is divided into a number of 4×4 pixel blocks. Herein assuming that the intra-block pixel value is xij (i, j=1~4) the average value in a block LA, the gradation width index LD, the maximum value $L_{max}$, the minimum value $L_{min}$, the quantized value $\phi ij$ (where i equals a value 1 to 4 and j equals a value from 1 to 4), and the decoding value yij ([i, j=1~4]), the encoding sequence is as shown in FIG. 16.

As shown in FIG. 16 illustrating the decoding sequence, at first the maximum and the minimum pixel values in a block are obtained, average values Q1 and Q4 of the pixel values belonging to the top and bottom areas of four areas obtained by dividing the difference between the maximum value and the minimum value respectively are computed. An average value of said Q1 and Q4 and a difference between said Q1 and Q4 are defined as the average value LA and the tone width index LD respectively.

Then each pixel value in a block is divided into four portions according to the average value LA and the gradation width index LD, and each portion is quantized to a two-bit quantized value. The code data comprises six bytes. As shown in FIG. 17, the first byte is an average value, the second byte is a gradation width index, and the third to sixth bytes are quantized values.

As for the decoding sequence, as shown in FIG. 18, four types of quantized values are decoded according to the average value LA, and the gradation width index LD. FIG. 19 shows an example where this fixed length GBTC type of code is applied on an image memory circuit for a color printer. With this encoding system, it becomes possible to compress artificial images, such as letters and CG (Computer Graphics) which are substantially degraded when compressed with the JPEG system, without being degraded largely.

However, in the conventional methods as described above, code data for a block comprises six bytes, so that the compression ratio is ⅜, which means that effective compression can not be realized. Especially in case of artificial images such as letters and computer graphics, there are many blocks each comprising one or two pixel(s), and also unnecessary data is encoded, which makes it impossible to efficiently encode image data.

SUMMARY OF THE INVENTION

It is an object of the present invention to improve efficiency in encoding, maintaining the image quality as that of images decoded according to the conventional scheme and reducing unnecessary code data as conventionally observed in encoding.

To achieve the object as described above, the present invention provides a multi-valued (color) image encoding apparatus which encodes multi-valued (color) image data by dividing the image data to blocks and generating code data for each of said blocks, having a control means for extracting data comprising pixel values in each of said blocks, changing composition of the code data according to the data in each block, and switching composition of the code data according to the remainder obtained when a typical value in a block, which is a portion of said code data, is divided by an integral number.

When all pixel values in a block are identical, the control means above checks whether pixel values in the subsequent blocks are identical or not, and encodes image data by linking a plurality of blocks according to the results of checking.

When a block is composed of two types of pixel values, the control means encodes pixel value data according to a code number indicating an intra-block quantized value composition pattern in a plurality of blocks for encoding the pixel value data and a typical value in the block.

When encoding multi-valued image data by dividing the image data into several blocks and encoding the data block by block, if a block is composed or one or two values, the encoding apparatus according to the present invention does not generate determined code data like in the conventional type of encoding apparatus, but switches composition of code data by referring to the remainder number obtained when a typical value in the block is divided by an integral number according to composition of pixel values in the block, and furthermore executes coding a quantized value composition pattern in the block and encoding the quantized values by linking a plurality of blocks to reduce unnecessary code data. This enables efficient compression without increasing the code length.

Other objects and features of this invention will become understood from the following description with reference to the accompanying drawings.

BRIEF DESCRIPTION OF THE DRAWINGS

FIG. 8 is an explanatory view illustrating code data composition when a block according to the present invention is composed of pixel values of 0 and 255;

FIGS. 9A and 9B are explanatory views illustrating configuration of a pattern code table according to the present invention;

FIG. 15 is an explanatory view illustrating the fixed length GBTC type of encoding system which is a conventional type of encoding method;

FIG. 16 is an explanatory view illustrating an encoding sequence in the fixed length GBTC type of encoding system which is a conventional type of encoding method;

FIG. 17 is an explanatory view illustrating code data in the fixed length GBTC types of encoding system which is a conventional type of encoding method;

DESCRIPTION OF THE PREFERRED EMBODIMENTS

Figure 1:
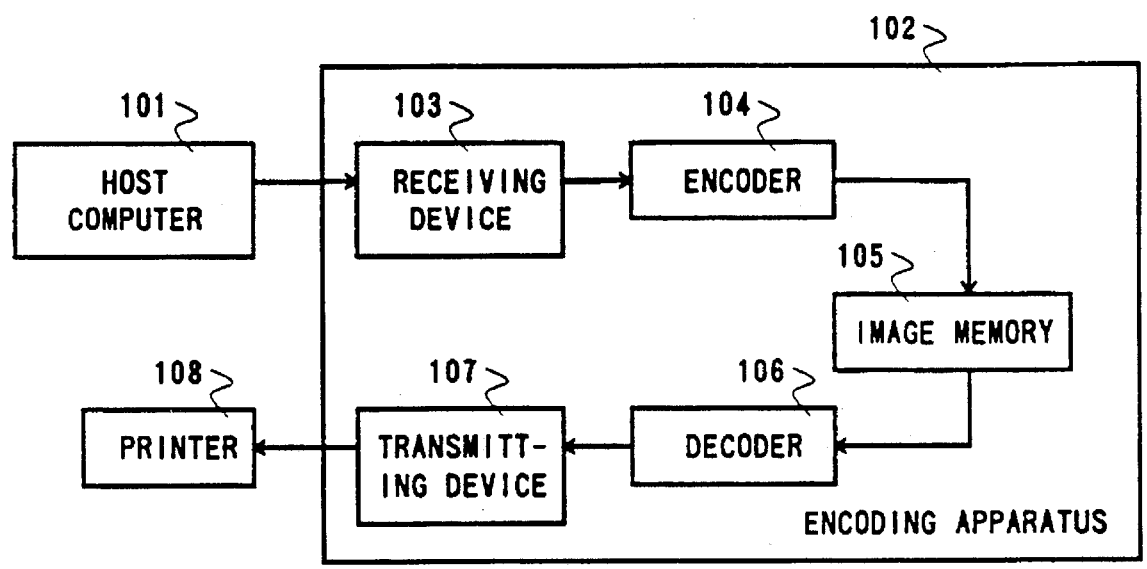
FIG. 1 is a block diagram illustrating system configuration of a multi-value (color) image encoding apparatus according to the present invention.

An embodiment of the present invention is described with reference to the related drawings. FIG. 1 is a block diagram illustrating a system configuration for a multi-valued (color) encoding apparatus according to the present invention. In this figure, designated as reference numeral 101 is a host computer for inputting image data into an encoding apparatus 102. The encoding apparatus according to the present invention comprises a receiving device 103 for receiving data sent from the a data source such as host computer 101, an encoder 104 for encoding image data, an image memory 105 for storing encoded image data, a decoder 106 for decoding encoded data, and a transmitting device 107 for transmitting image data to a printer 108. The reference numeral 108 indicates a printer for outputting and printing image data on recording paper.

Next the basic operations of the encoding apparatus according to the present invention are described. The encoding apparatus receives multi-valued (color) image data supplied from a scanner (image reader), a facsimile device, and a host computer 101 with the receiving device 103 and encodes the image with the encoder 104 prior to writing the image data into the image memory 105, or reads multi-valued image data from the image data memory 105 and decodes the image data with the decoder 106 prior to outputting the data through the transmitting device 107 with the printer 108.

Figure 2:
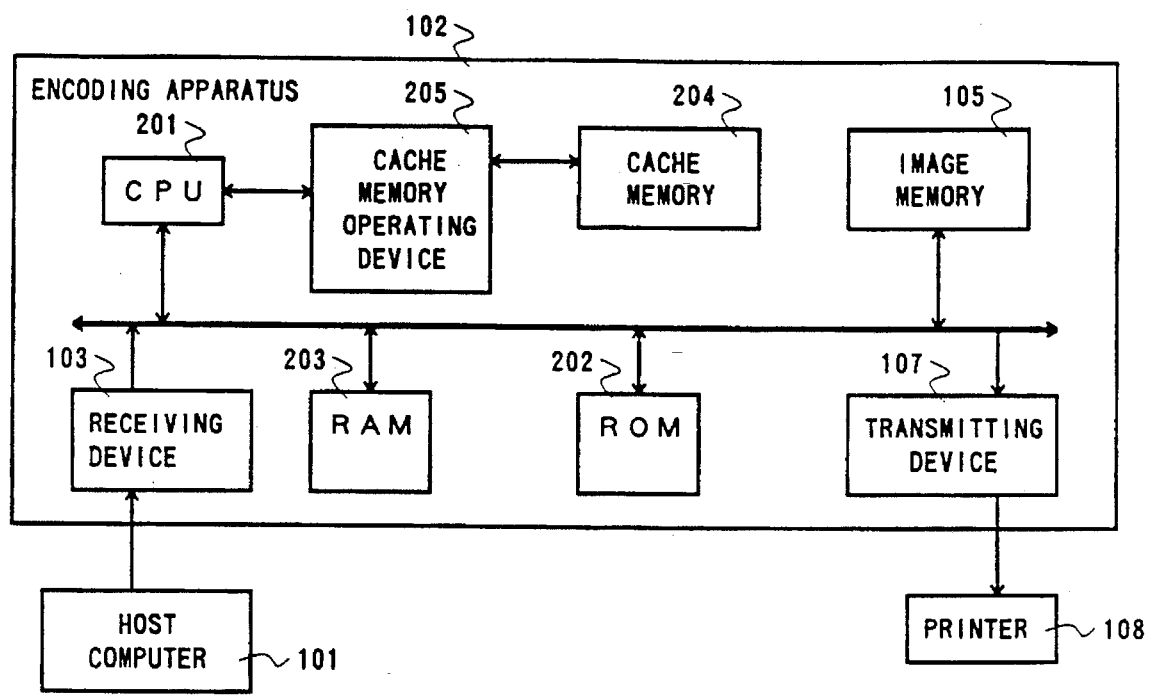
FIG. 2 is a block diagram illustrating general configuration of the encoding apparatus according to the present invention.

FIG. 2 is a block diagram illustrating detailed configuration of the multi-valued (color) encoding apparatus shown in FIG. 1. In this figure, the encoding apparatus 102 comprises a microcomputer system having a CPU 201, a ROM 202 and RAM 203, an image memory 105, a cache memory 204, a cache memory operating device 205 for operating said cache memory 204, a receiving device 103, and a transmitting device 107. The functions of each component are described below.

The CPU 201 is a central processing unit which controls the encoding apparatus 102 according to commands sent from programs stored the ROM 202 and the host computer 101 or other. The ROM 202 is a read-only memory which stores fixed data in the form of a control program for running the CPU 201 and fixed data in the form of pattern code composed of pixel. The RAM 203, a work memory for the CPU 210, is a random access memory used as, for instance, input buffer for storing an input data.

The image memory 105 is a random access memory to write code data of images therein, whereas the cache memory 204 is a random access memory to temporally store image data divided into a plurality of blocks. The device 103 receives data sent from, for instance, the host computer 101, whereas the transmitting device 107 transmits image data to the printer 108 where printing takes place.

Figure 3:
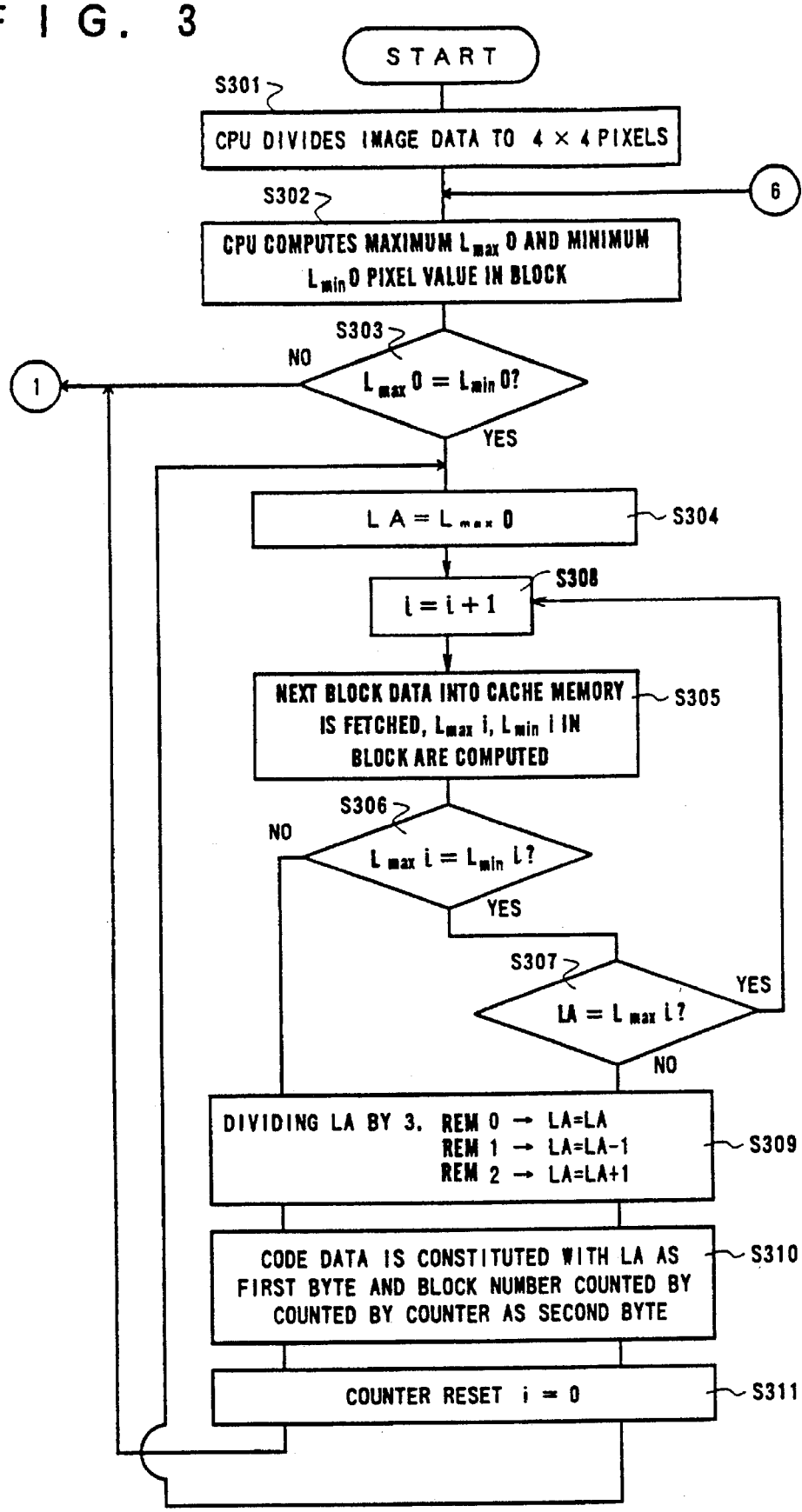
FIG. 3 is a flow chart illustrating encoding operations of an encoder according to the present invention.
Figure 4:
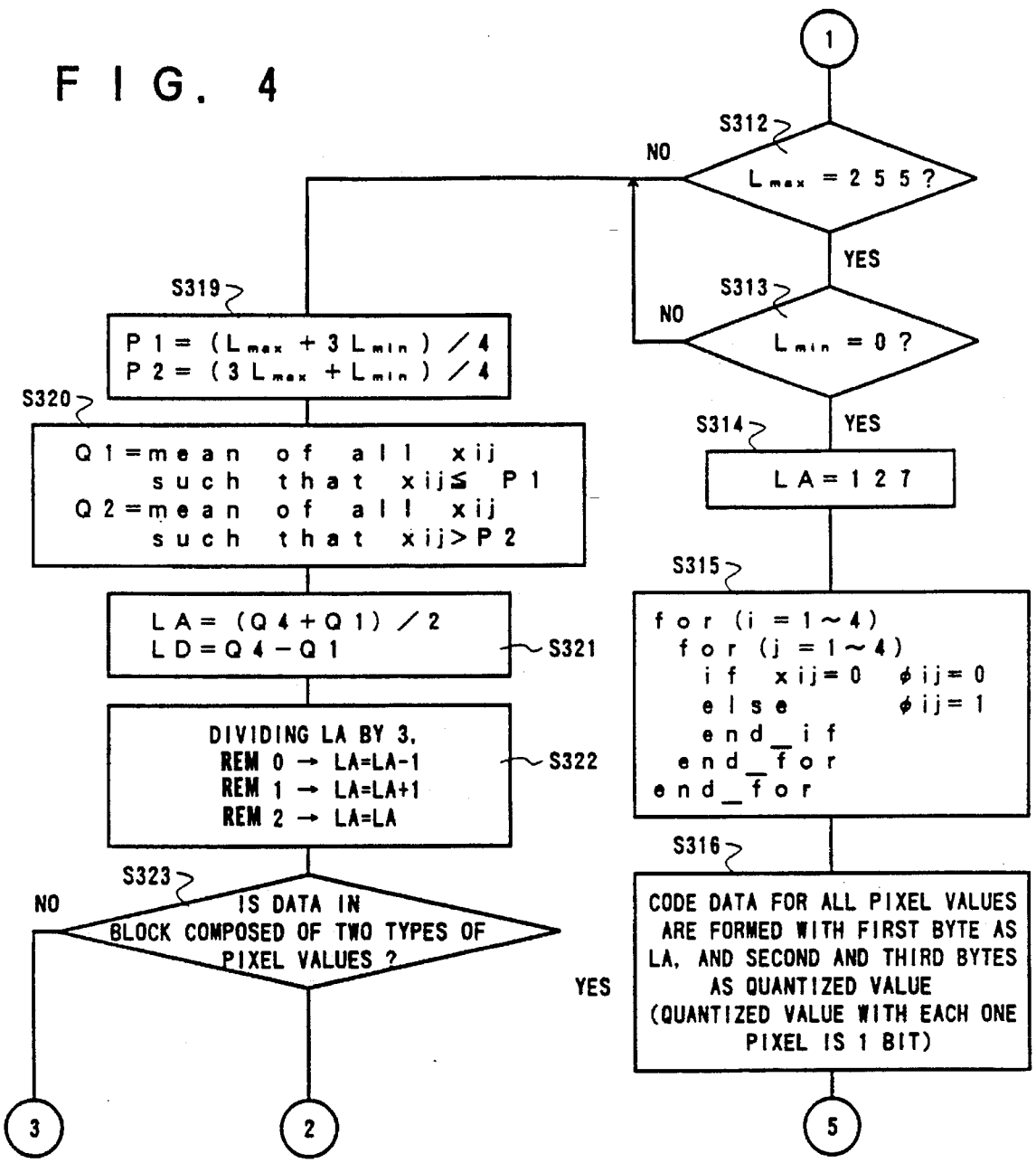
FIG. 4 is a flow chart illustrating encoding operations of the encoder according to the present invention.
Figure 5:
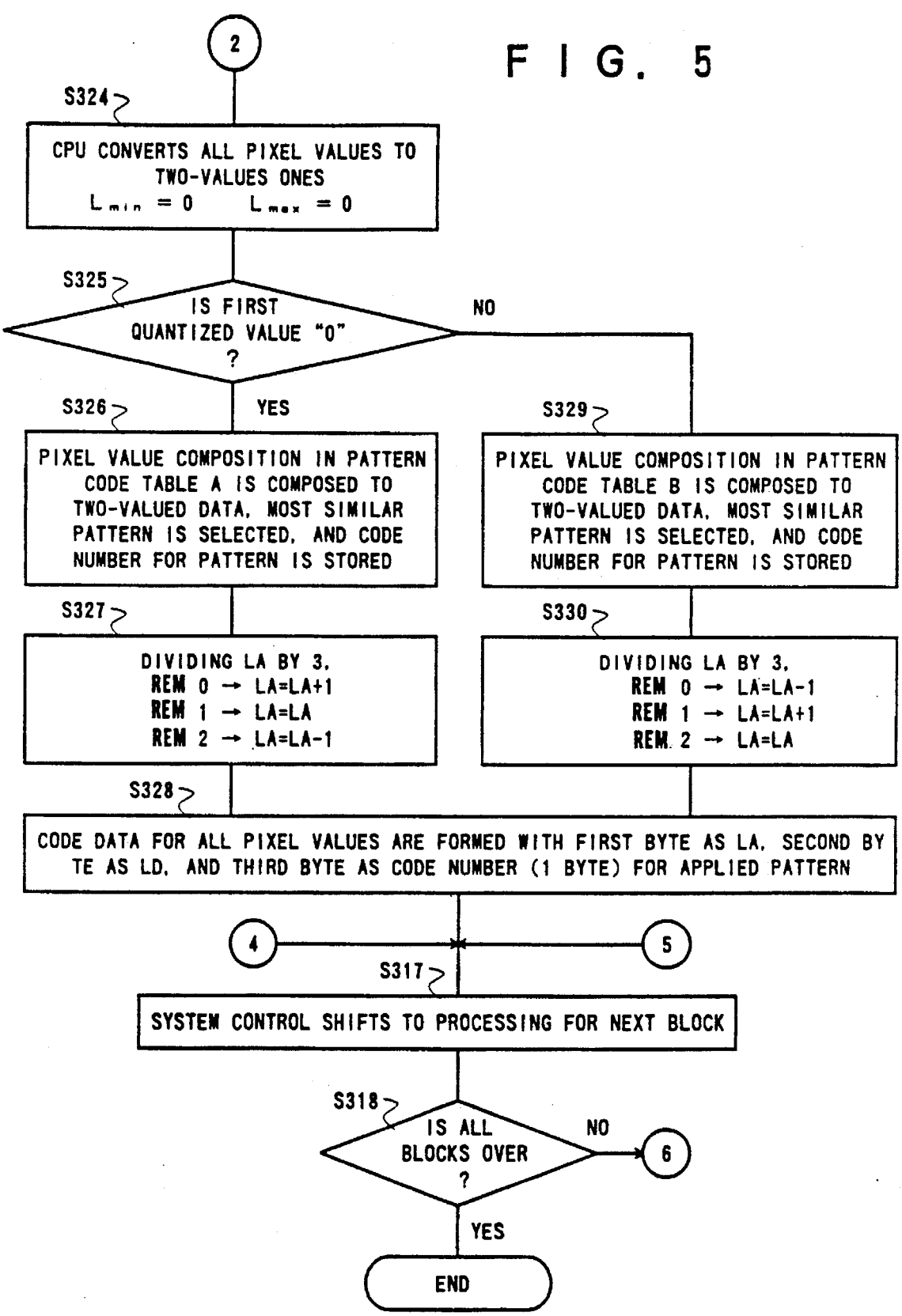
FIG. 5 is a flow chart illustrating encoding operations of the encoder according to the present invention.

Next, the operation of the encoding apparatus according to the present invention is described. FIGS. 3 to 6 are flow charts each indicating an encoding operation by the encoder 104 shown in FIG. 1. In FIG. 3, initially, a portion (4096 bytes) of image data sent from, for instance, the host computer 101 is temporarily stored in the RAM 203. The CPU 201 divides image data into 4×4 pixels (S301), and stores the data in the cache memory 204. Furthermore the CPU 201 computes the maximum pixel value $L_{max}0$ and the minimum pixel value $L_{min}0$ in block S302.

Then the encoding apparatus makes a determination as to whether $L_{max}0$ is equal to $L_{min}0$ or not (S303), and if the encoding apparatus determines in the step that $L_{max}0$ is equal to $L_{min}0$, the encoding apparatus determines that all pixel values in a block are the same values, computes and stores an average value LA of the pixel values as $L_{max}0$ (S304), then fetches the next block of data into the cache memory 204, computes $L_{max}i$ and $L_{min}i$ similarly (S305), and makes a determination as to whether $L_{max}i$ is equal to $L_{min}i$ or not (S306), where i was incremented from 0 in block S308. In this process, if the encoding apparatus determines in this step that $L_{max}i$ is $L_{min}i$, then the encoding apparatus makes a determination as to whether LA is equal to $L_{max}i$ or not (S307), and if the encoding apparatus determines that LA is equal to $L_{max}i$, the encoding apparatus increments the count from i to i+1 (S308), and returns to loop element S305 for the next iteration of the loop.

In this processing, if it is determined that the pixel values in a block are the same as those in the previous block, the process loop from S304 to S308 is repeated, and a number i of blocks each composed of the same pixel values is computed.

Figure 7:
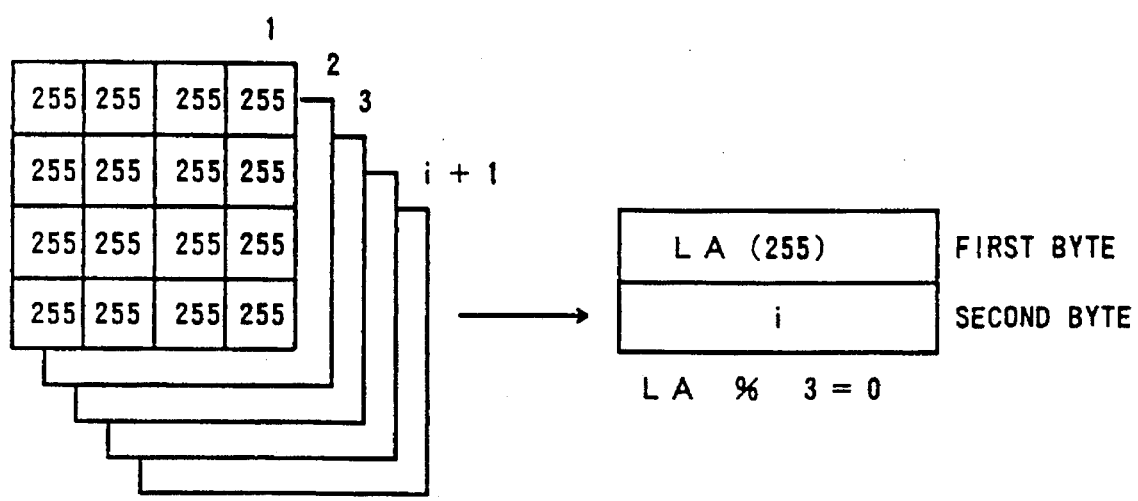
FIG. 7 is an explanatory view illustrating code data composition when a block according to the present invention is composed of one type of pixel values.

In this step, in order to indicate the code data composition above, LA is changed so that the remainder obtained by dividing LA by 3 will be 0 (S309). Specifically, LA is changed to the closest multiple of 3. The code data composition in this case is shown in FIG. 7. Then the code data is constituted with LA as the first byte and i as the second byte, said code data stored in the image memory 1015 (S310) and counter reset (i reset to 0) (S311). On the other hand, in the above step S303, if it is determined that the block is not composed of the same pixel values, in FIG. 4, at first a determination is made as to whether the block is composed of two pixel values of 0 and 255 or not (S312 and S313), and if it is determined that the block is composed of two types of values of 0 and 255, LA is changed so that the remainder obtained when LA is divided by 3 will be 1 (LA=127) (S314). Then pixel values in the block are converted to 2-valued ones (S315). Then, code data for all pixel values in the block are formed with the first byte as LA and the second and third bytes converted to 2-valued ones, and the code data is stored in the image memory 105 (S316). The code data composition in this case is shown in FIG. 8.

Next description is made for processes other than that for constituting pixel values above. In the steps S312 and S313, if it is determined that data in a block in the cache memory 204 is not composed of the same pixel values nor with the two values of 0 and 255, the CPU 201 computes average values Q1 and Q4 of pixel values belonging to the top section and the bottom section of the four sections obtained by dividing the difference between the maximum value $L_{max}$ and the minimum value $L_{min}$ respectively (S319 and S320). Then, an average value of and a difference between Q1 and Q4 are computed as the average value LA and the gradation width index LD respectively (S321). Furthermore, to indicate that data in the block are not composed of the same pixel values nor with the two types of values of 0 and 255, LA is changed so that an a remainder obtained by dividing LA by 3 is 2 (S322).

After executing the above processes, the CPU 201 makes a determination as to whether data in a block is composed of two types of pixel values or not by comparing pixel value data in the block in the cache memory 204 to $L_{max}$ and $L_{min}$ in the RAM 203 (S323). In this step, if it is determined that data in the block is composed of two types of pixel values, in FIG. 5, the CPU 201 converts all pixel values in the block to 2-values ones ($L_{min}$ to 0 and $L_{max}$ to 1) (S324), said converted pixel values stored in the cache memory 204.

Figures 9A, 9B:
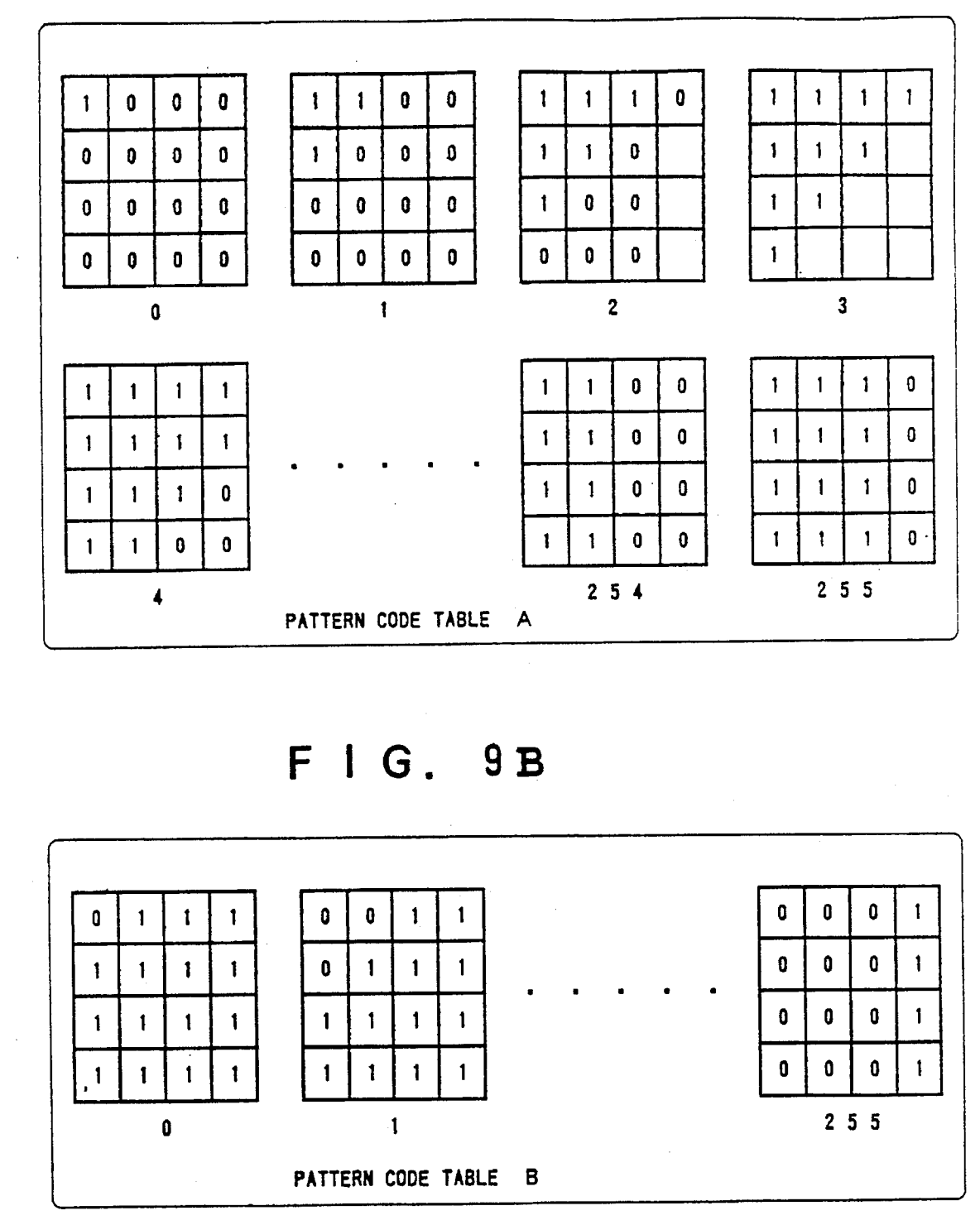

Furthermore it is determined whether a first quantized value in a block is 0 or not (S325), and in this step, if it is determined that the first value in the block is 0, a pattern code table A having 255 types of 2-valued intra-block pixel value composition pattern code stored in the ROM 202 is selected, the pixel value composition in the pattern code table A is compared to the 2-valued data in the cache memory 204, the most similar pattern is selected, and a code number for the pattern is stored in the RAM 203 (S326). Then, in order to indicate that data in the block is composed of two types of pixel values and encoding was executed according to the pattern code table A, LA is changed so that the remainder obtained by dividing LA by 3 is 1 (S327). An example of pattern code is shown in FIG. 9.

On the other hand, in step S325, if it is determined that the first pixel value in a block is not 0, encoding is executed similarly according to a pattern code table B (S329), and to indicate that the pattern code table B has been selected, LA is changed so that a remainder obtained by dividing LA by 3 is 2 (S330).

Figure 10:
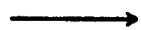
FIG. 10 is an explanatory view illustrating code data composition when a block according to the present invention is composed of 2 types of pixel values.

Then a process in step S327 or step S330 is executed, and code data is constituted with the first byte as LA, second byte as LD and third byte as a code number for the applied pattern, and the code data is stored in the image memory 105 (S328). The code data composition in this case is shown in FIG. 10.

Figure 6:
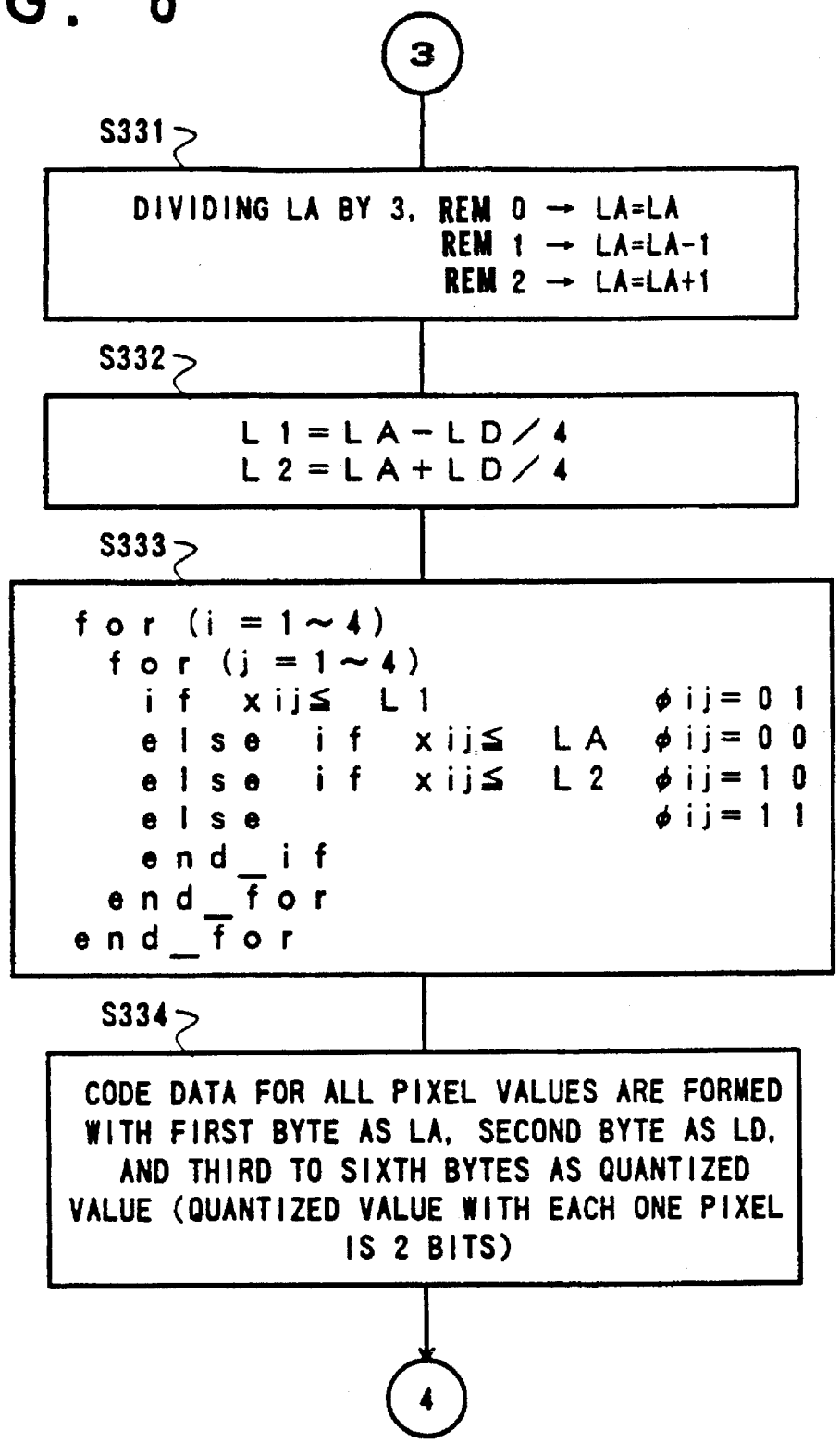
FIG. 6 is a flow chart illustrating encoding operations of the encoder according to the present invention.
Figure 11:
FIG. 11 is an explanatory view illustrating code data composition when a block according to the present invention is composed of 3 or more types of pixel values.

In the step S323 above, if it is determined that all of pixel values in a block are not composed of $L_{max}$ and $L_{min}$, in FIG. 6, in order to indicate the fact, LA is changed so that the remainder obtained by dividing LA by 3 is 0 (S331). Then, each pixel value in a block is divided into four portions according to the average value LA and the gradation width index LD, each of said portions quantized to a two-bit quantized value (S332, S333). The code data is composed of six bytes. Then code data is constituted with the first byte as LA, second byte as LD, and third to sixth bytes as quantized values, and the code data is stored in the image memory 105 (S334). The code data composition in this case is shown in FIG. 11.

The above processes are repeated until processing for all blocks is complete. In other words, when a process in step S316, step S328, or in step S334 is over, the system control shifts to processing for the next block (S317), determination as to whether processing for all blocks is over or not (S318), and if it is determined that processing for all blocks is not over, the system control returns to the above step S302, and if it is determined that processing for all blocks is over, this process is terminated.

Figure 12:
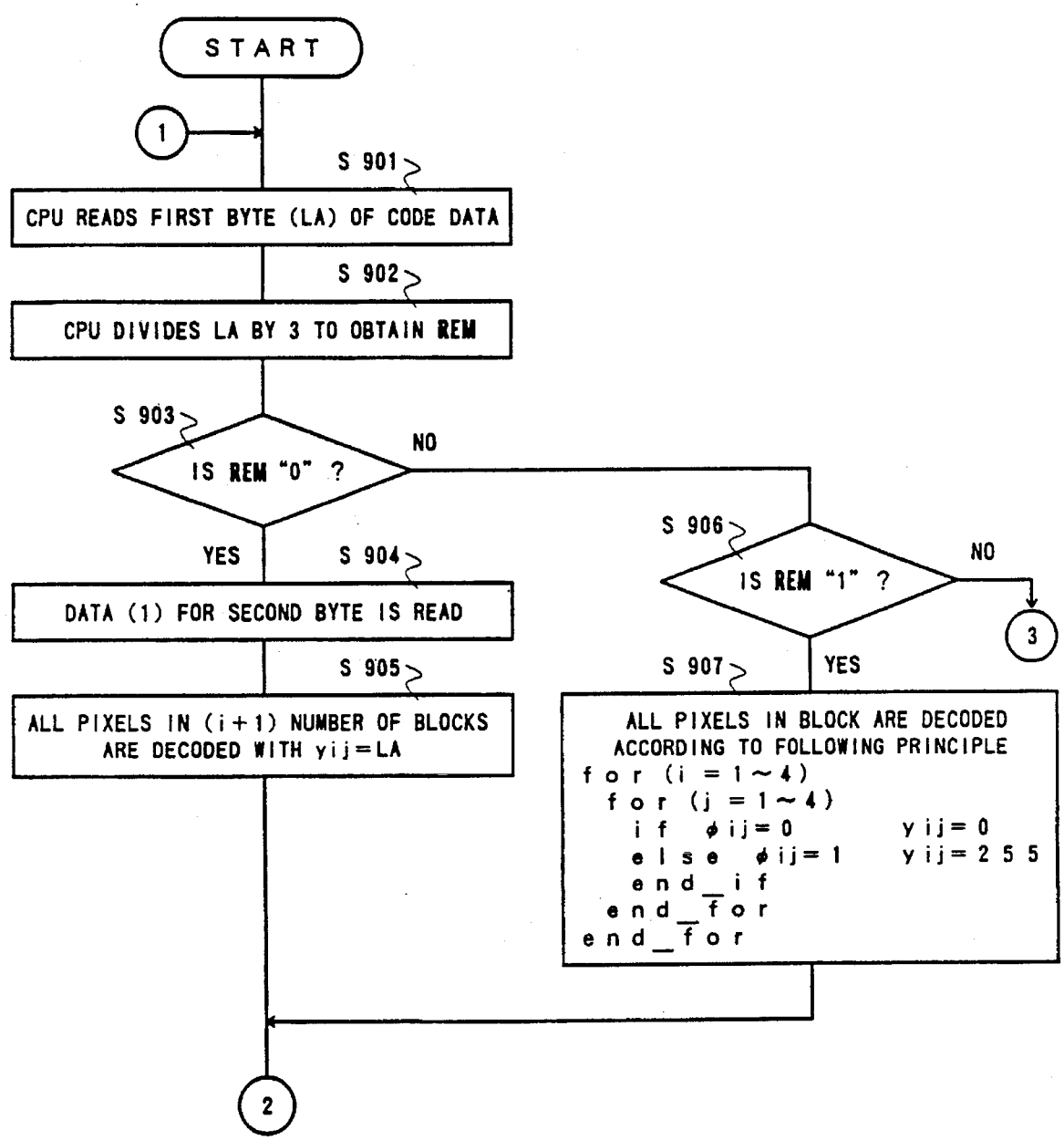
FIG. 12 is a flow chart illustrating decoding operations of a decoder according to the present invention.
Figure 13:
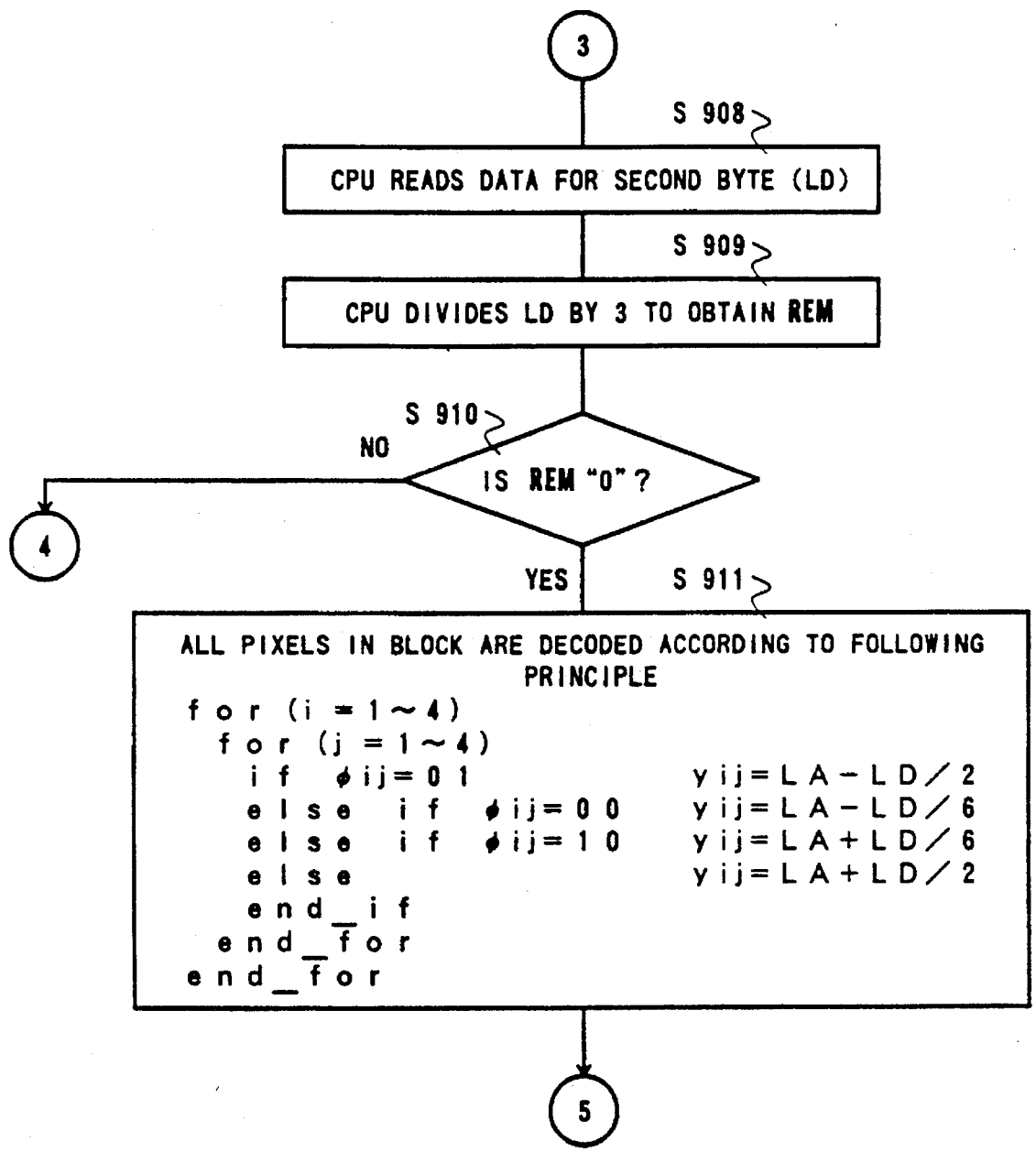
FIG. 13 is a flow chart illustrating decoding operations of the decoder according to the present invention.
Figure 14:
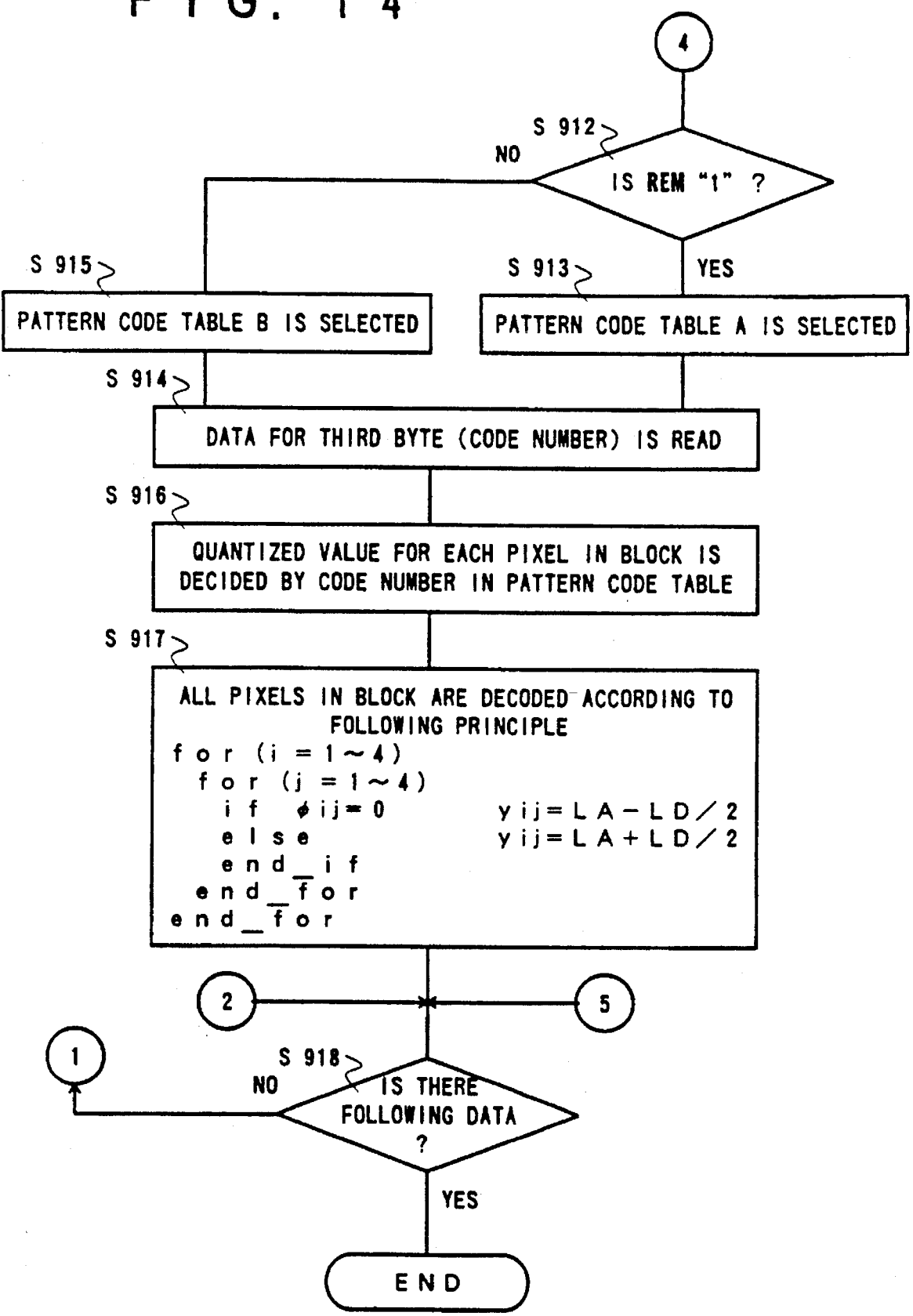
FIG. 14 is a flow chart illustrating decoding operations of the decoder according to the present invention.
Figure 18:
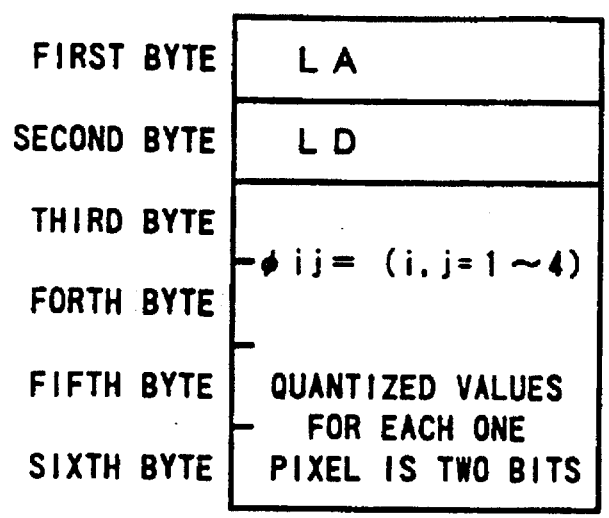
FIG. 18 is an explanatory view illustrating an encoding sequence in the fixed length GBTC types of encoding system which is a conventional type of encoding method.
Figure 19:
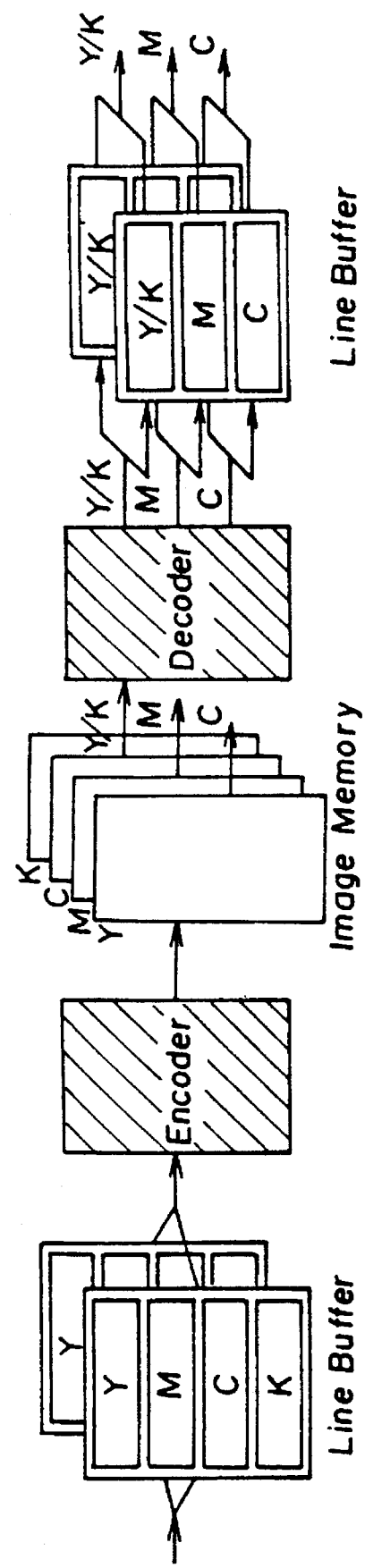
FIG. 19 is an explanatory view illustrating an example where the conventional fixed length GBTC type of encoding system is applied to an image memory for a color printer.

FIG. 12 to FIG. 14 are flow charts each illustrating operation for decoding with the decoder 106 shown in FIG. 1. In this figure, the CPU 201 reads the first byte (LA) of code data stored in the image memory 105 (S901), and furthermore divides LA by 3 to obtain the remainder (S902). Then, determination as to whether the remainder is 0 or not is executed (S903), and in this process, if it is determined that the remainder is 0, data for the second byte is read (S904), all pixels in (i+1) number of blocks are decoded with yij=LA (S905), and the decoded data is temporally stored in the RAM 203.

On the other hand, if it is determined in the step S903 that the remainder is not 0, furthermore determination as to whether the remainder is 1 or not is executed (S906). In this processing, if it is determined that an remainder obtained by dividing LA by 3 is 1, all pixels in the block are decoded according to the following principle (S907):

When the quantized value is 0, yij=0, and

When the quantized value is 1, yij=255 and the decoded data is temporally stored in the RAM 203.

Also in the step S906 above, if it is determined that the remainder obtained by dividing LA by 3 is 2, in FIG. 13, the CPU 201 determines that the remainder is not 1, read data for the second byte (LD) (S908), and divides the LD by 3 to obtain the remainder (S909). Then determination as to whether the remainder is 0 or not is executed (S910), and if it is determined in this step that the remainder is 0, all pixels in the block are decoded according to the following principle (S911):

When the quantized value is 01, yij=LA–LD/2

When the quantized value is 00, yij=LA–LD/6

When the quantized value is 10, yij=LA+LD/6

When the quantized value is 11, yij=LA+LD/2 and the decoded data is temporally stored in the RAM 203.

If it is determined in the above step S910 that the remainder is not 0, furthermore determination as whether the remainder is 1 or not is executed as shown in FIG. 14 (S912). In this processing, if it is determined that the remainder obtained by dividing LD by 3 is 1, the CPU 201 selects the pattern code table A stored in the ROM 202 (S913), reads data for the third byte (code number) (S914), searches for a quantized value number in a block corresponding to the code number in the pattern code table A, and decides a quantized value for each pixel in the block (S916).

If it is determined that the remainder obtained by dividing LD by 3 is 2, the CPU 210 determines in step S912 that the remainder obtained by dividing LA by 3 is not 1, selects the pattern code table B stored in the ROM 202 (S915), and decides a quantized value for each pixel in the block similarly (S914, S916). Then, all pixels are decoded according to the following principle (S917):

When the quantized value is 0, yij=LA−LD/2
When the quantized value is 1, yij=LA+LD/2,
and the decoded data is temporally stored in the RAM 203.

Then, the CPU 201 executes a process in the step S905, step S907, step S911, or step S917, makes a determination as to whether there exists the following data or not (S918), and if it is determined that there exists the following data, the system control returns to the above step S901, and if it is determined that there is no data to be processed next, this processing is terminated. Namely, the CPU 201 sends decoded data stored in the RAM 203 by 4096 bytes to the transmitting device 107, and outputs the decoded data through the printer 108. The CPU 201 repeats the above processing no code data is stored in the image memory 105. When there is no code data to be decoded, the CPU 201 sends remaining decoded data stored in the RAM 203 to the transmitting device 107, and outputs the decoded data through the printer 108.

As described above, with the encoding apparatus and encoding method thereof according to the present invention, when encoding multi-valued image data by dividing the data to blocks and encoding the data block by block, if data in a block is composed of 1 value or 2 values, composition of code data is switched according to the remainder obtained by dividing a typical value in the block by an integral number, and furthermore operations for coding a quantized value composition pattern in a block and for encoding data in a plurality of blocks in a concatenated mode, so that it is possible to reduce unnecessary code data maintaining image quality equivalent to that of a decoded image according to the conventional system as well as to improve efficiency in encoding.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image encoding apparatus encodes multi-valued image data by dividing the image data into blocks and generating code data for each of the blocks, said image encoding apparatus comprising:

a controller for extracting data having pixel values in each of said blocks, means for changing composition of said code data according to said data in each block, and means for switching composition of said code data according to the remainder obtained when a value in a block, which is a portion of said code data, is divided by an integral number.

2. An image encoding apparatus according to claim 1, wherein said controller checks whether pixel values in first and second blocks are identical or not, and when all pixel values in a block are identical, said controller encodes image data by identifying the number of blocks each composed of the same pixel values.

3. An image encoding apparatus according to claim 1, wherein, when a block is composed of two types of pixel values, said controller encodes pixel value data according to a code number indicating an intra-block quantized value composition pattern in a plurality of blocks for encoding said pixel value data and a value in said block.

4. An image encoding method for encoding multi-valued image data by dividing the image data into blocks and generating code data for each of the blocks, said method comprising the steps of:

extracting data comprising pixel values in each of said blocks;

changing composition of said code data according to said data block; and switching composition of said code data according to the remainder obtained when a value in a block, which is a portion of said code data, is divided by a integral number.

\* \* \* \* \*